(12) United States Patent
Solomon

(10) Patent No.: US 9,258,627 B2
(45) Date of Patent: *Feb. 9, 2016

(54) LOCATING UTILITY METERING DEVICES

(75) Inventor: Arnold Cory Solomon, Covington, GA (US)

(73) Assignee: Southern Company Services, Inc., Atlanta, GA (US)

( * ) Notice: Subject to any disclaimer, the term of this patent is extended or adjusted under 35 U.S.C. 154(b) by 997 days.

This patent is subject to a terminal disclaimer.

(21) Appl. No.: 12/879,248

(22) Filed: Sep. 10, 2010

(65) Prior Publication Data

US 2012/0062390 A1    Mar. 15, 2012

(51) Int. Cl.
*G08C 15/06* (2006.01)
*H04Q 9/00* (2006.01)

(52) U.S. Cl.
CPC .............. *H04Q 9/00* (2013.01); *H04Q 2209/60* (2013.01); *H04Q 2209/86* (2013.01)

(58) Field of Classification Search
CPC ......................................................... H04Q 9/00
USPC ........................... 340/870.01, 870.02, 870.03
See application file for complete search history.

(56) References Cited

U.S. PATENT DOCUMENTS

| | | | | |
|---|---|---|---|---|
| 5,940,009 A * | 8/1999 | Loy | ...................... | G01R 22/066 324/110 |
| 2003/0158677 A1 * | 8/2003 | Swarztrauber | ......... | G01D 4/008 702/62 |
| 2004/0236620 A1 * | 11/2004 | Chauhan | ................ | G06Q 10/06 705/7.14 |
| 2005/0137813 A1 * | 6/2005 | Swarztrauber | ......... | G01D 4/008 702/62 |
| 2005/0237221 A1 * | 10/2005 | Brian | ...................... | H04L 67/12 340/870.02 |
| 2005/0242957 A1 * | 11/2005 | Lindsay | ............. | G06K 19/0716 340/572.7 |
| 2006/0178208 A1 * | 8/2006 | Cole | ......................... | G07F 9/08 463/25 |
| 2006/0242323 A1 * | 10/2006 | Sanderford | ............... | G01S 5/02 709/245 |
| 2007/0149204 A1 * | 6/2007 | Redi | ..................... | H04W 52/46 455/446 |
| 2008/0109387 A1 * | 5/2008 | Deaver | ............. | G01R 19/16547 705/412 |
| 2011/0068947 A1 * | 3/2011 | Holman | ................. | G01D 4/004 340/870.02 |
| 2011/0210959 A1 * | 9/2011 | Howard | ................... | G01S 5/12 345/418 |

* cited by examiner

*Primary Examiner* — Amine Benlagsir

(74) *Attorney, Agent, or Firm* — Thomas|Horstemeyer, LLP

(57) ABSTRACT

Disclosed are various embodiments for locating utility metering devices. Utility metering devices are those that are lost or stolen and that are facilitating unauthorized utility service access. Many AMI and/or AMR deployments lack the ability to remotely deactivate a meter. Accordingly, embodiments of this disclosure can generate a zone of interest in which an unauthorized utility metering device is located, and the unauthorized utility metering device can be subsequently located within the zone of interest.

17 Claims, 13 Drawing Sheets

LOCATING UTILITY METERING DEVICES

BACKGROUND

With the deployment of advanced metering infrastructure (AMI), automatic meter reading (AMR) technologies and other smart metering technology to meter utility usage, meter theft and subsequent unauthorized use of meters to obtain utility service can result in theft of utility services. Many AMI and/or AMR deployments lack the ability to remotely disable a lost and/or stolen meter so that the meter can no longer receive utility service. AMI and/or AMR deployments often lack this ability so that a potential security breach whereby unauthorized access to a grid does not result in a risk of large scale cutting of utility access to legitimate users. Additionally, many smart meters employed in such a deployment lack location based technologies such as global positioning system (GPS) that allow the meter to be located by a utility provider.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

In the following discussion, a general description of the system and its components is provided, followed by a discussion of the operation of the same. Embodiments of this disclosure relate to locating lost and/or stolen utility metering devices. In particular, embodiments of this disclosure relate to locating lost utility metering devices that are employed to facilitate unauthorized utility usage and/or consumption. In the context of this disclosure, utility usage can include electricity, water, or any other metered utility or service. In many advanced metering infrastructure (AMI), automatic meter reading (AMR) and other smart metering deployments to meter utility usage, meter theft and subsequent unauthorized use of meters to obtain utility service can result in theft of utility services. Meters compatible with such deployments will be referred to herein as utility metering devices and/or smart meters. Many AMI and/or AMR deployments lack the ability to remotely deauthorize a lost and/or stolen smart meter so that the smart meter can no longer receive utility service.

AMI and/or AMR deployments often lack this ability so that a potential security breach whereby unauthorized access to a grid does not result in a risk of large scale cutting of utility access to legitimate users. Additionally, many smart meters employed in such a deployment lack location based technologies such as global positioning system (GPS) that allow the meter to be located by a utility provider. However, utility metering devices in various metering deployments possess the capability to report utility usage to a central office and/or a central billing system. Accordingly, embodiments of this disclosure can take advantage of the communication capabilities of utility metering devices to locate a lost or stolen utility metering device that is being employed to facilitate unauthorized utility usage.

Embodiments of the present disclosure can also be employed to locate authorized metering devices that may be malfunctioning and/or degrading system operations or performance. As some examples, a metering device may be in need of servicing and/or replacement (e.g., invalid transceiver ID, duplicate transceiver ID's in a deployment, etc.). Accordingly, although this disclosure is discussed primarily with reference to locating unauthorized metering devices, it should be appreciated that embodiments of this disclosure can also be used to locate authorized metering device or any type of metering device for various reasons.

Figure 1:
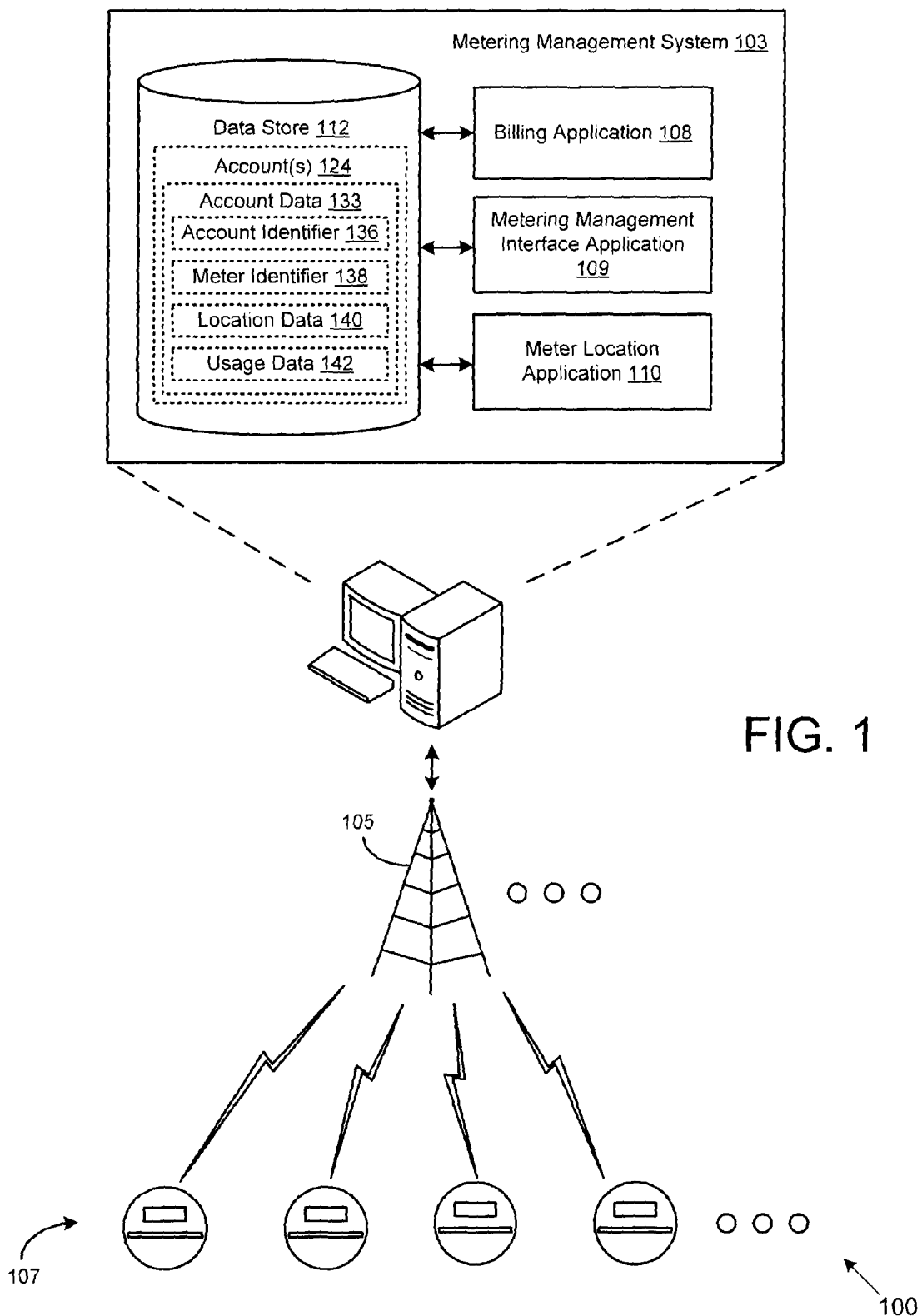
FIG. 1 is a drawing of a utility metering environment according to various embodiments of the present disclosure.

With reference to FIG. 1, shown is a utility metering environment 100 according to various embodiments. The utility metering environment 100 includes metering management system 103 in communication with a metering infrastructure. The metering infrastructure can, in one non-limiting embodiment, include one or more communications towers 105 that can receive utility usage information from a fleet of utility metering devices 107 that are deployed at various customer premises.

The metering management system 103 may comprise, for example, a computing device, a server computer or any other system providing computing capability or resources. Alternatively, a plurality of computing devices may be employed that are arranged, for example, in one or more server banks or computer banks or other arrangements. For example, a plurality of computing devices together may comprise, for example, a cloud computing resource, a grid computing resource, and/or any other distributed computing arrangement. Such computing devices may be located in a single installation or may be distributed among many different geographical locations. For purposes of convenience, the computing device is referred to herein in the singular. Even though the computing device is referred to in the singular, it is understood that a plurality of computing devices may be employed in the various arrangements as described above.

The communications towers 105 can be configured to receive usage data and other information from utility metering devices 107 deployed in the metering infrastructure. As should be appreciated, utility metering devices 107 can be configured to provide one-way communication or two-way communication to report usage data associated with a meter, status information, tamper alarms, and other administrative data. Additionally, the metering management system 103 can, via communications towers 105, can transmit administrative information or various commands that can cause a utility metering device 107 to take some course of action. As one example, the metering management system 103 can transmit a command via the communications towers 105 causing a utility metering device 107 to report usage data to the metering management system 103. It should further be appreciated that a utility metering device 107 can also interact with any system (e.g., a computing device) complying with a communications protocol specified by the metering infrastructure, regardless of whether such a system is transmitting data and/or messages via the depicted communications towers 105.

The utility metering devices 107 can, in some embodiments, transmit and/or receive data wirelessly to and from the depicted metering management system 103 via one or more communications towers 105. In one embodiment, metering devices 107 can communicate with the metering management system 103 via wireless messages in a proprietary or non-proprietary format in licensed or unlicensed wireless spectrum. In other embodiments, the metering management system 103 can communicate with the metering management system 103 via standardized cellular communications technology such as, but not limited to, GPRS, CDMA, and other technologies as can be appreciated. In some embodiments of this disclosure, the utility metering devices 107 can communicate with the metering management system 103 or other systems a described herein via power line carrier systems that allow the utility metering device 107 to transmit data to the metering management system 103 via power lines that exist to provide utility service to account holders.

Various applications and/or other functionality may be executed in the metering management system 103 according to various embodiments. In the depicted non-limiting embodiment, the metering management system 103 can execute a billing application 108 that can generate bills and/or other reports associated with an account in a utility service environment. The metering management interface application 109 can provide administrator access into the various data and other management aspects of the metering management system 103. Additionally, to facilitate location of lost and/or stolen utility metering devices according to embodiments of this disclosure, the metering management system 103 can also execute a meter location application 110. The meter location application 110 can detect whether a utility metering device is facilitating unauthorized utility service access. In other words, the meter location application 110 can detect the presence of unauthorized metering devices that are being employed in the metering infrastructure.

Also, various data is stored in a data store 112 that is accessible to the metering management system 103. The data store 112 may be representative of a plurality of data stores as can be appreciated. The data stored in the data store 112, for example, is associated with the operation of the various applications and/or functional entities described below. In the depicted illustration, the data store 112 can include information regarding accounts 124 served by a utility service. With regard to various accounts 124 served by a utility service, the data store 112 can store various account data 133 for each account 124. As one non-limiting implementation, each account can be associated with an account identifier 136 that uniquely identifies the account.

A meter identifier 138 can specify one or more unique identifiers for one or more utility metering devices 107 in the metering infrastructure that are associated with the account. Location data 140 can specify a location at which metering devices associated with the account are installed or expected to be located. The location data 140 can also specify other metering devices that are installed or located near one or more metering devices associated with the account. In other words, the location data 140 can specify other metering devices that are within range to receive a signal from the metering devices associated with the account. Location data 140 can also specify communications towers 105 that receive usage data reported by metering devices 107 in the metering infrastructure.

Historical usage data 142 reported by a utility metering device associated with the account can be stored in the data store 112 from which the metering management system 103 can generate bills and/or reports regarding utility usage associated with various accounts. Usage data 142 can be tracked on a per meter basis as well as on a per account basis. Other information and data can be stored in the data store 112 and/or in other location accessible to the metering management system 103 such as rate plan information, billing history, and other data regarding a utility account that should be appreciated. However, these variations should be understood by a person of ordinary skill in the art and are not necessary for an understanding of embodiments according to this disclosure.

The meter location application 110 can facilitate location of unauthorized utility metering devices by first detecting the presence of unauthorized utility metering devices. The meter location application 110 can make this determination by determining whether a lost meter report is generated and/or received from utility personnel and/or utility consumers. The meter location application 110 can also determine whether the metering infrastructure reports utility consumption that is not associated with an account maintained by the metering management system 103. If complaints from legitimate or authorized account holders of high utility billing relative to the account holder's expected usage are received, the meter location application 110 can identify a utility metering device associated with the account as a potentially stolen utility metering device.

Utility metering devices 107 employed in the depicted example and in other embodiments of the disclosure can also be configured to generate and transmit a tamper alarm via the metering infrastructure to the metering management system 103 if the utility metering device is opened or tampered with by unauthorized personnel. Accordingly, the meter location application 110 can detect an unauthorized metering device if a tamper alarm is received from a metering device via the metering infrastructure. The meter location application 110 can determine whether the tamper alarm results in a lost or stolen metering device. To this end, the meter location application 110 can, in one embodiment, instruct utility personnel to investigate a tamper alarm reported by a utility metering device to determine whether the meter is merely damaged or if it is lost or stolen. Accordingly, utility personnel can input, via a user interface provided by the metering management system 103, data indicating whether a tamper alarm indicates the existence of an unauthorized metering device or a false alarm.

The meter location application 110 can also detect an unauthorized utility metering device by determining whether accounts that receive complaints for excessively high bills are indicative of a lost or stolen meter. Unauthorized use of a metering device to access utility service can often result in excessive use of the meter to access the utility service because the offender is not paying for such usage. However, in the case of a stolen meter that another party is using to access utility service, the stolen meter can still be associated with a legitimate account in the metering management system 103. Accordingly, such excessive usage may get charged to a legitimate account holder that is associated with the stolen utility metering device identified by the account's meter identifier 138.

The meter location application 110 can also generate a tower exception report, which can, based at least upon the location data 140, reveal utility metering devices that are reporting usage data via a particular communications tower 105 that was not previously receiving usage data from the utility metering device. Although multiple communications towers 105 in the metering infrastructure may occasionally receive usage data from a particular metering device 107 due to normal radio propagation variations, large geographic changes are a strong indication of the existence of an unauthorized utility metering device. The meter location application 110 can also use the tower exception report to determine a geographic area in which the unauthorized meter is located. Because the location of the communications towers 105 is known, and the location of authorized metering devices that report utility usage via the communications tower 105 is also known, the meter location application 110 can derive a general geographic area in which the unauthorized utility metering device is located from this information.

Figure 2:
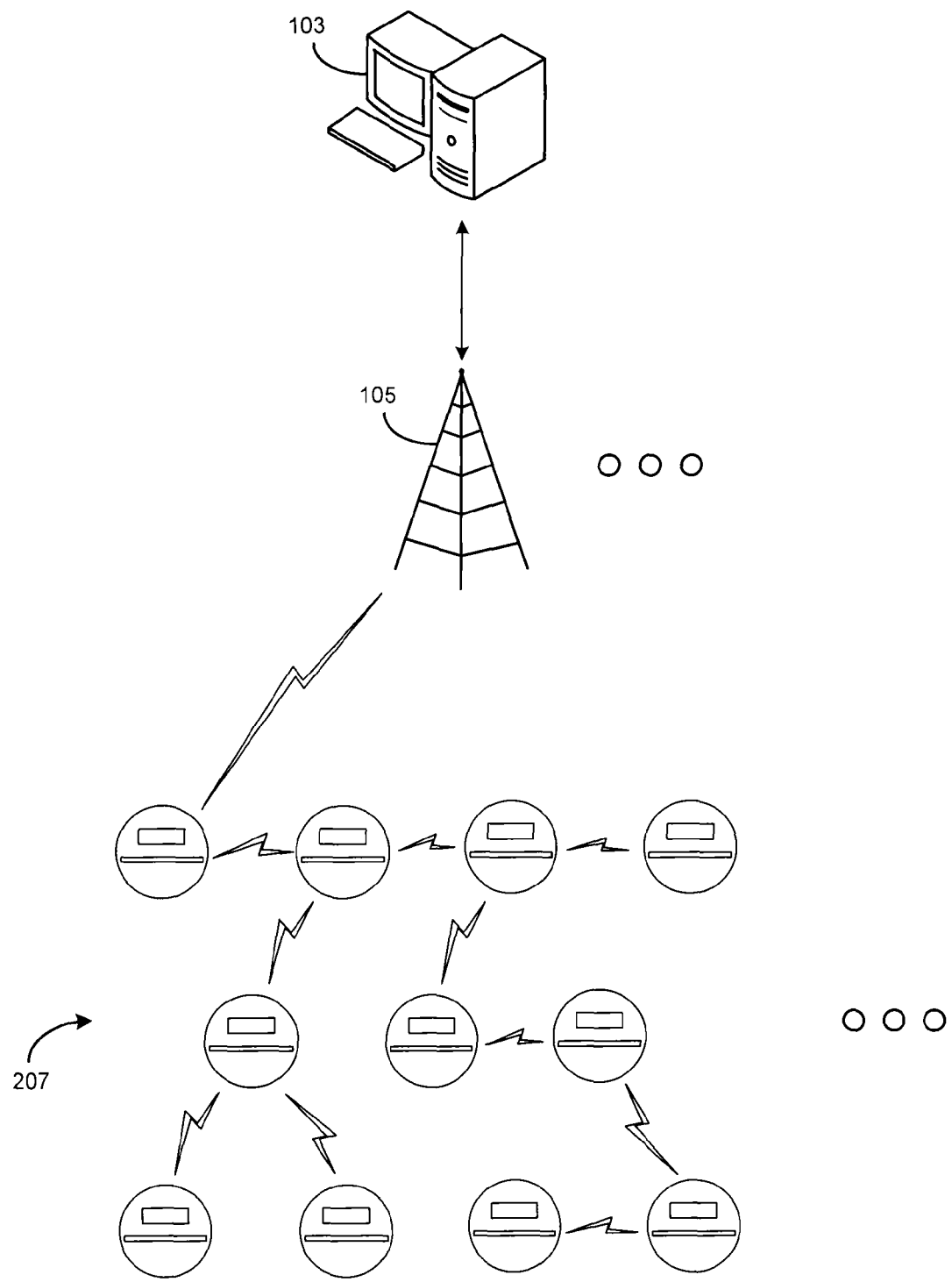
FIG. 2 is a drawing of a utility metering environment employing meters capable of arrangement in a mesh network according to various embodiments of the present disclosure.

Reference is now made to FIG. 2, which depicts an alternative example of a metering infrastructure that includes utility metering devices 207 arranged in a mesh network, where each node (e.g. the utility metering devices) in the network are capable of acting as an independent router. The arrangement of utility metering devices 207 in a mesh network is increasingly employed in modern meter deployments so that the number and expense of communications towers 105 can be reduced. To this end, the various utility metering devices 207 in the depicted example can communicate with other metering devices and act as a repeater whereby messages received from another utility metering device in the deployment repeat messages, such as utility usage data, that is received from other metering devices. In this way, data from utility metering devices 207 in the deployment can hop from meter to meter until it reaches a utility metering device 207 that is within range of a communications tower 105, which can forward data to the metering management system 103.

In order to locate unauthorized metering devices in a metering infrastructure, the meter location application 110 can issue a command to the unauthorized metering device to transmit a message to the metering infrastructure. As one example, the meter location application 110 can issue a command to an unauthorized metering device to report its utility usage information. Accordingly, the meter location application 110 can then instruct other authorized metering devices within signal range of the unauthorized metering device to report a signal strength associated with a message from the unauthorized metering device. In the context of this disclosure, signal strength can be measured as a signal to noise ratio, a bit error rate, jitter benchmarks, or other measures as can be appreciated. It should also be appreciated that any numerical representations of a signal strength in the disclosure or drawings are shown for illustrative purposes, and are not intended to represent an absolute or limiting value of a signal strength. Signal strengths can also be inferred from various metrics and/or properties that can be detected or retrieved from a utility metering device, as not all metering devices may report and/or record a signal strength metric.

Accordingly, in one embodiment, the meter location application 110 can instruct authorized utility metering devices to report a signal strength associated with messages received by the authorized utility metering devices from the unauthorized utility metering device. The meter location application 110 can then, based at least on a signal strength reported by authorized metering devices that are within range to receive a signal from the unauthorized utility metering device, generate a map that plots the signal strength received versus the location of these authorized metering devices, as their location is known. It should also be appreciated that in addition to the above described mesh network, embodiments of this disclosure can be implemented in a deployment where metering devices are arranged in a partial mesh network, and metering devices located based upon transmission towers with which a metering device communicates as well as other metering devices that can receive a signal from the device.

Figure 3:
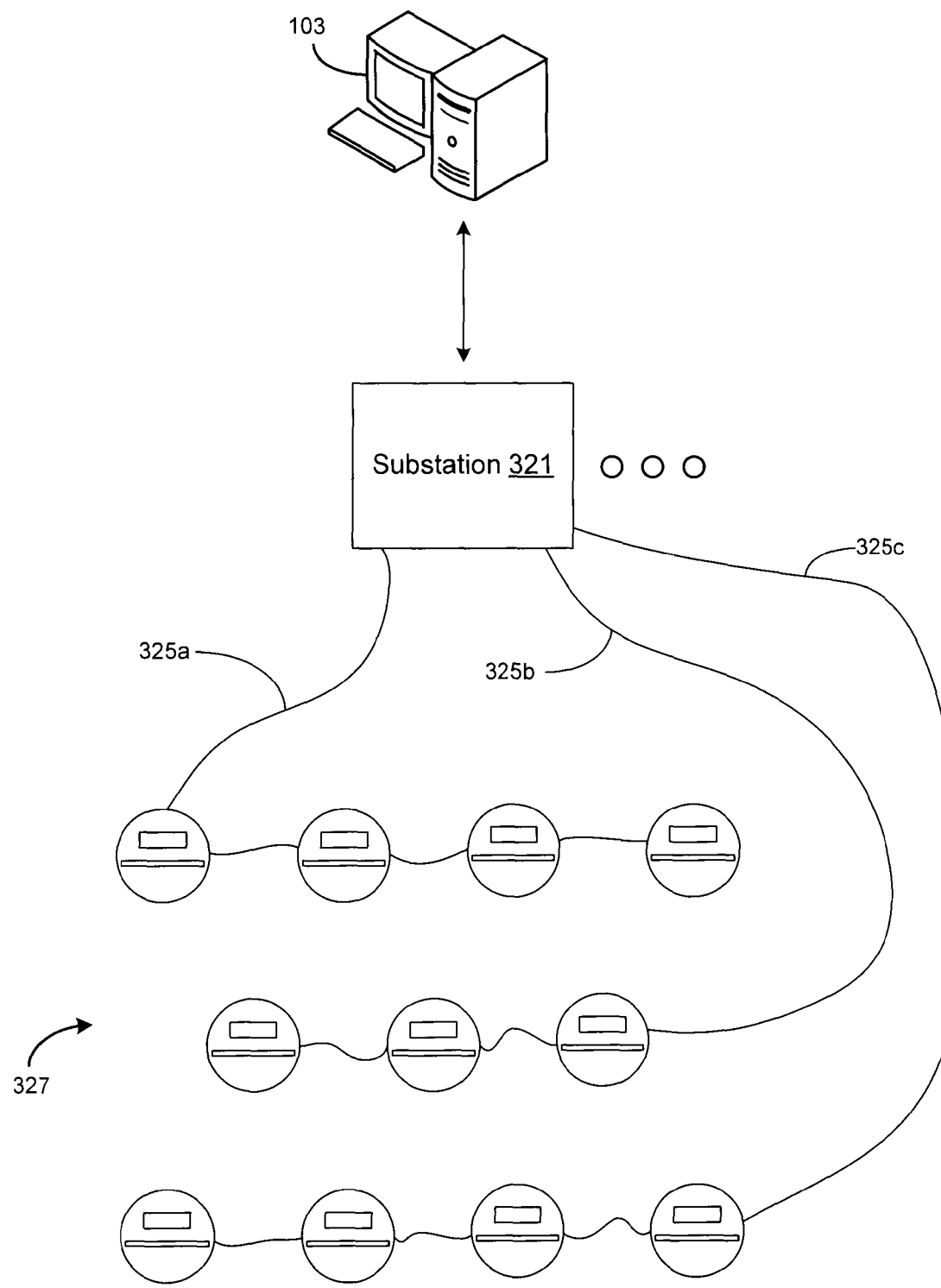
FIG. 3 is a drawing of a utility metering environment employing meters in a power line carrier network according to various embodiments of the present disclosure.

Reference is now made to FIG. 3, which depicts an alternative example of a metering infrastructure that includes utility metering devices 327 configured to report utility usage data via a two way power line carrier (PLC) system infrastructure. In the drawing of FIG. 3, the metering management system 103 can be in communication with a distribution substation 321, which can distribute power to the various metering devices and users associated with the devices via distribution lines 325a, 325b, 325c. A deployment can include multiple substations 321 that are geographically disparate and that serve various users in this way. As noted above, a metering device can be designated as an unauthorized utility metering device by applying various rules, which are similarly applicable in a deployment consistent with FIG. 3.

Accordingly, if an unauthorized utility metering device is detected by the meter location application 110, it can then determine a substation 321 in a deployment through which the unauthorized metering device is reporting utility usage data or making other types of data transmissions. Because the location of the various substations in a deployment can be known, the geographic area associated with a substation 321 can be designated as a zone of interest. In some power line carrier systems, a substation identifier and/or meter identifier can be included in a transmission, which can facilitate identifying a zone of interest based on a substation identifier. In other embodiments, a receiver (e.g., a dielectrically isolated clamp receiver, a "hot stick", etc.) can be employed to determine a high voltage distribution line in a distribution grid in which the unauthorized utility metering device is transmitting or that observes the highest signal strength associated with the unauthorized utility metering device.

Accordingly, the unauthorized utility metering device can be thereafter located by examining the various branches of distribution lines 325a, 325b, 325c emanating from the substation 321 identified as the zone of interest. A feeder and phase associated with a transmission can also be identified to narrow a location of the utility metering device. In one embodiment, a command can be issued to the unauthorized utility metering device via a field unit that instructs the device to initiate a transmission via a distribution line. In one embodiment, such a command can be issued by the metering management system 103 or other infrastructure configured to communicate with metering devices in a PLC deployment. In some embodiments, utility personnel can communicate with the metering management system 103 and cause the metering management system 103 to issue such a command. In another embodiment, the meter management system 103 can issue a command instructing the device to send transmission via a distribution line periodically. Accordingly, a receiver (e.g., a dielectrically isolated clamp receiver, a "hot stick", etc.), can be coupled to one of the distribution lines 325a, 325b, 325c and the signal strength measured. Comparative measurements can be taken on a plurality of the distribution lines 325a, 325b, 325c emanating from a substation 321, and the highest signal strength associated with a transmission from the unauthorized device can be identified. Accordingly, a similar investigation can be conducted on the various branches emanating from the branch associated with the highest signal strength until the unauthorized utility metering device is located or a narrower zone of interest can be defined within a geographic area served by the substation 321.

Figure 4:
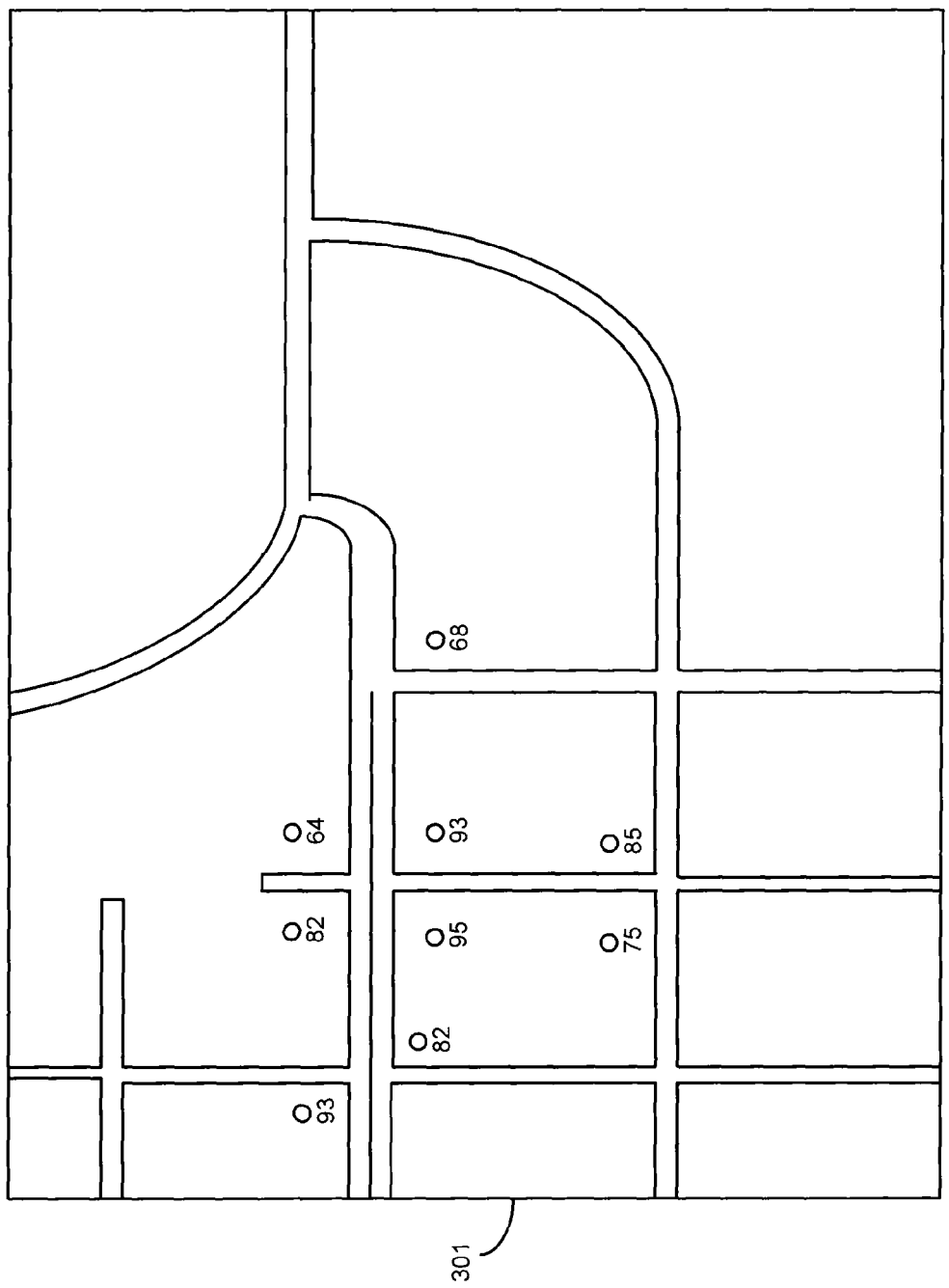
FIG. 4 is a drawing of a map of authorized metering devices arranged by signal strength relative to an unauthorized metering device, which can be generated by the meter location application.

Accordingly, reference is now made to FIG. 4, which depicts one example of a map 301 that can be generated by the meter location application 110 to facilitate locating an unauthorized utility metering device in a deployment according to FIGS. 1 and/or 2. The depicted map 301 represents a signal strength reported by various authorized utility metering devices for a transmission received from an unauthorized utility metering device for which a location is unknown. Because, as described above, utility metering devices can be configured to operate in a partial and/or fully meshed network, meaning that the utility metering devices may communicate with one another, a signal strength associated with the unauthorized utility metering device can be reported by any authorized utility metering device that is within range to measure a signal from the unauthorized device.

Figure 5:
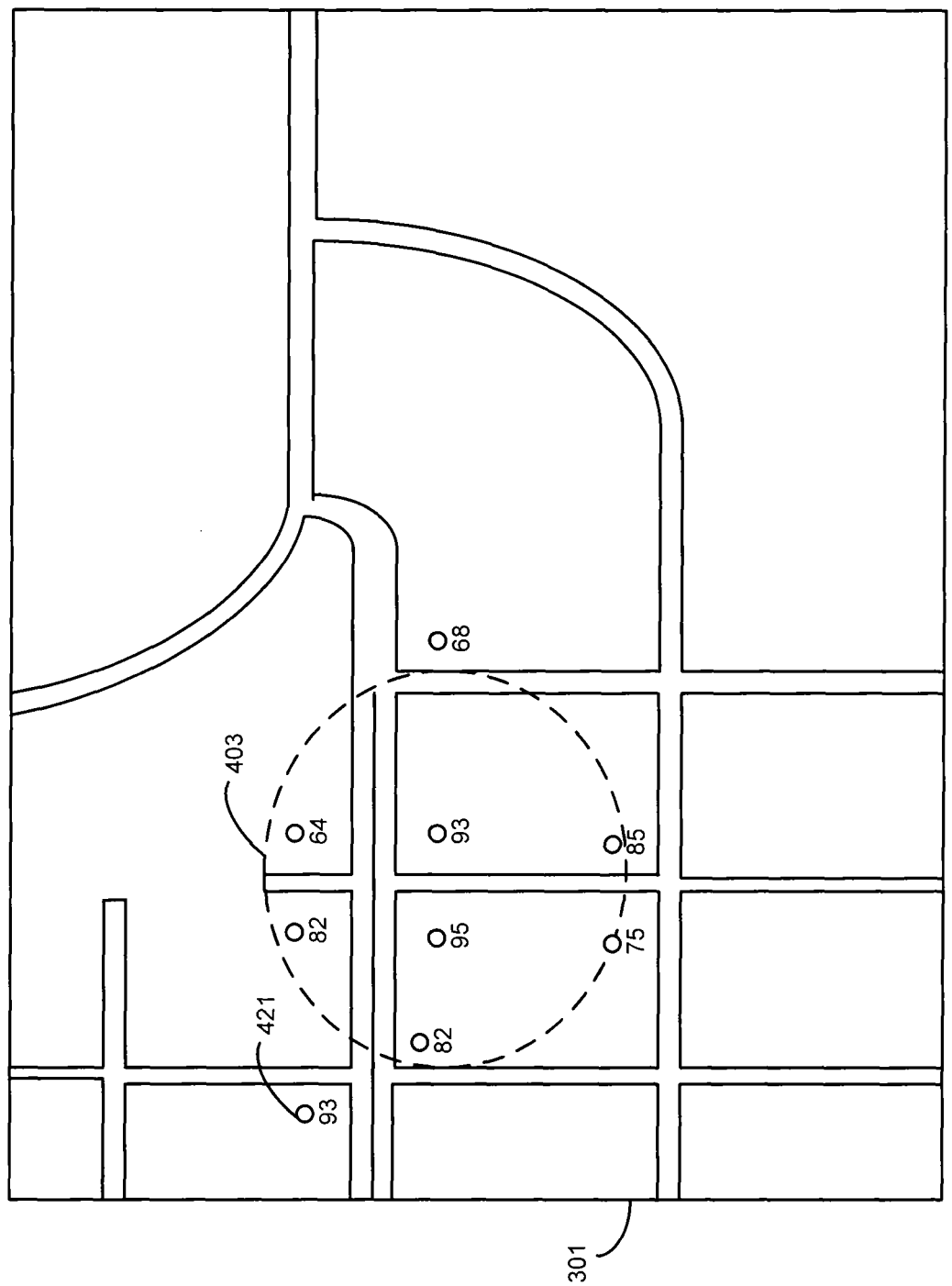
FIG. 5 is a drawing of a zone of interest in a map of authorized metering devices arranged by signal strength relative to an unauthorized metering device, which can be generated by the meter location application.

Accordingly, reference is now made to FIG. 5, which depicts the map 301 generated by the meter location application 110. Upon generating a map of the signal strengths reported by authorized metering devices with regard to an unauthorized utility metering device, the meter location application 110 can then generate a zone of interest 403 in which the unauthorized utility metering device is likely to be located. In the depicted example, the meter location application 110 can generate a zone of interest 403 by determining an area or location in which the unauthorized utility metering device of interest is likely to be located. In the depicted embodiment, the meter location application 110 can generate a zone of interest that specifies an address, city block, neighborhood, community, etc., in which the highest signal strengths reported by authorized utility metering devices are located.

In some embodiments, the meter location application 110 can take multiple samples of signal strengths associated with an unauthorized utility metering device from authorized devices within range over a period of time. It should be appreciated that signal strengths can vary based upon topography, interference, and other factors that may cause a single measurement to produce a potentially inaccurate map 301. Accordingly, the meter location application 110 can be tuned to sample signal strengths associated with the unauthorized utility metering device over a long period of time and generate a map containing average signal strengths over the time period.

Referring back to the specific, non-limiting example of FIG. 5, the meter location application 110 can designate a zone of interest 403 around the authorized utility metering devices reporting the highest signal strengths associated with the unauthorized utility metering device. In the depicted example, the meter location application 110 can determine that some authorized utility metering devices that report a high signal strength, such as the device marked by reference numeral 421, can be an outlier and not indicative of the location of the unauthorized utility metering device, particularly when various other utility metering devices report high signal strengths in relative close proximity to one another, as in the zone of interest 403. In one embodiment, the meter location application 110 can generate a ranked list of authorized utility metering devices according to measure signal strength of a transmission from the unauthorized utility metering device. The zone of interest can then be based upon the locations of the authorized utility metering devices in the ranked list. Accordingly, when the meter location application 110 generates a zone of interest 403, further investigation can occur within the zone of interest 403 to determine a more specific location of the unauthorized utility metering device.

Figure 6:
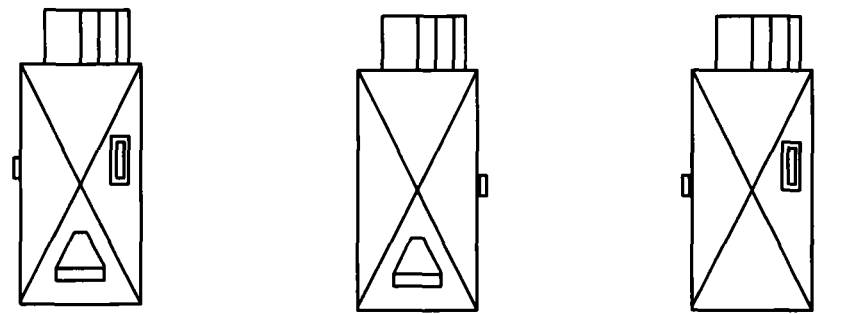
FIG. 6 is a drawing of a zone of interest and investigation with a directional antenna implemented with or without a camera.
Figure 6:
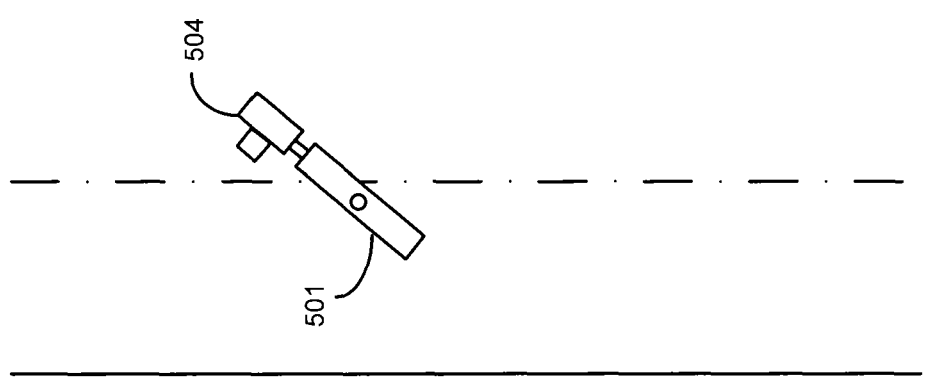
Figure 6:
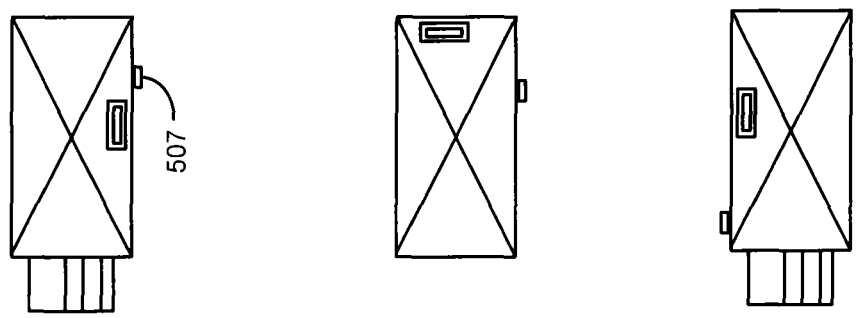

Therefore, reference is now made to FIG. 6, which depicts one example of this further investigative step within the zone of interest. At least one command can be issued to the unauthorized utility metering device that instructs the device to initiate a transmission. Accordingly, a directional antenna 501 can be located within the zone of interest and signal strength measurements taken at various angles to locate a specific address, structure or building with which the unauthorized utility metering device is located. In one embodiment, a command can be issued to the unauthorized utility metering device to transmit a message, and the direction antenna 501 can "listen" for the message and corresponding signal strength can be recorded. This process can be repeated at various angles from a location within the zone of interest until a more precise location of the unauthorized utility metering device is determined. In one embodiment, such a command can be issued to cause the metering device to transmit on secondary and/or separate recovery frequency. Additionally, in a spread spectrum environment, the receiving antenna can be coupled with a receiving device that can identify when a transmission emanating from the unauthorized utility metering device is received by the receiving antenna and signal strength should be recorded. In some spread spectrum deployments, a transmitting device issuing commands to metering devices or the receiving device can be configured with a recovery code to identify a signal emanating from the unauthorized utility metering device.

Additionally, the directional antenna 501 can be outfitted with a camera 504 so that video and/or imagery can be captured of the various locations and of the utility metering devices 507 installed at the various locations where measurements are taken. In one embodiment, the directional antenna 501 with or without a camera 504 can be vehicle mounted on the depicted vehicle 505. In some embodiments, the directional antenna 501 can include a Yagi-Uda antenna, or other directional antennas that are known.

The directional antenna 501 with or without camera 504 can further be coupled to a motorized mechanism that rotates the antenna 501 with or without camera 504 to facilitate the taking of measurements at various angles. Such a mechanism can also report an angle in which the antenna 501 with or without camera 504 are directed can be recorded along with a signal strength measurement and captured imagery in a data recording software application executed on a computing device in communication with the motorized mechanism, antenna 501 with or without camera 504. In some embodiments, a mobile investigation software application can be executed that can automate further investigation within a zone of interest.

Figure 7:
FIG. 7 is a drawing of a zone of interest and investigation with a directional antenna implemented with or without a camera.
Figure 7:
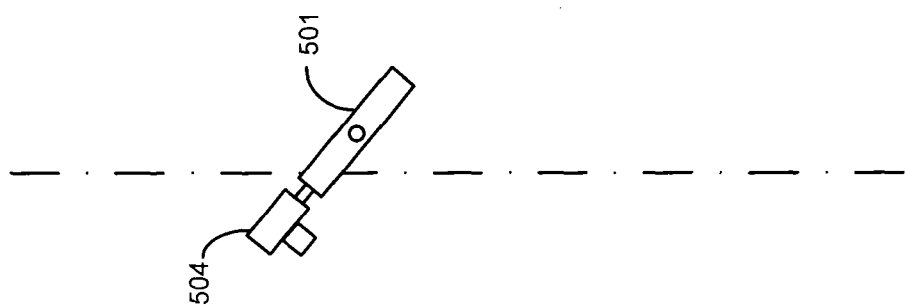
Figure 7:
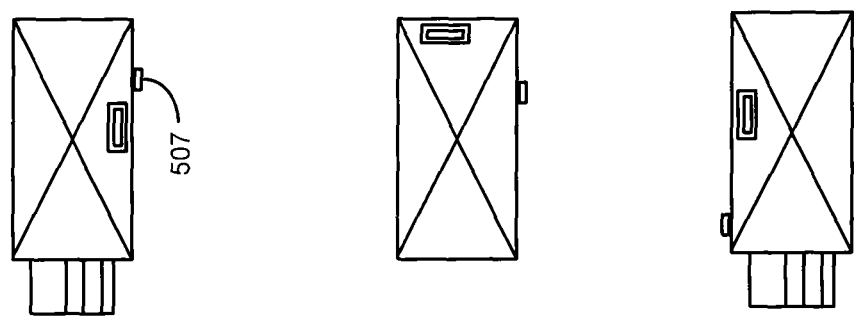

As shown in FIG. 7, the meter location application 110 and/or utility personnel can facilitate signal measurements associated with the unauthorized utility metering device from one or more locations at successive angles within the zone of interest. In one embodiment, if the unauthorized utility metering device is a two-way device, the utility personnel can issue a command to the device for the device to transmit a message, and the directional antenna 501 can capture a signal strength associated with the transmission, which can be recorded. In the case of a one-way utility metering device that employs a reporting interval, or a "bubble-up" interval, measurements can be taken with the directional antenna 501 according to these reporting intervals to ensure a measurement of a transmission by the unauthorized utility metering device at each of the successive angles. This process can be incrementally repeated at various angles until an angle relative to a particular location having the highest signal strength is identified. The camera 504 can also capture imagery of the address or structure associated with the various angles for evidence gathering purposes or subsequent image analysis.

In one embodiment, depending on the granularity of the directional antenna 501 employed, signal strength measurements can be taken at zero degrees and successively every thirty degrees thereafter. Upon identifying a thirty degree interval having the highest signal strength associated with the unauthorized utility metering device, additional measurements within the interval can be taken at successively smaller intervals so that a specific metering device on a structure or at a particular location within the zone of interest 403 can be identified as the unauthorized utility metering device.

Figure 8:
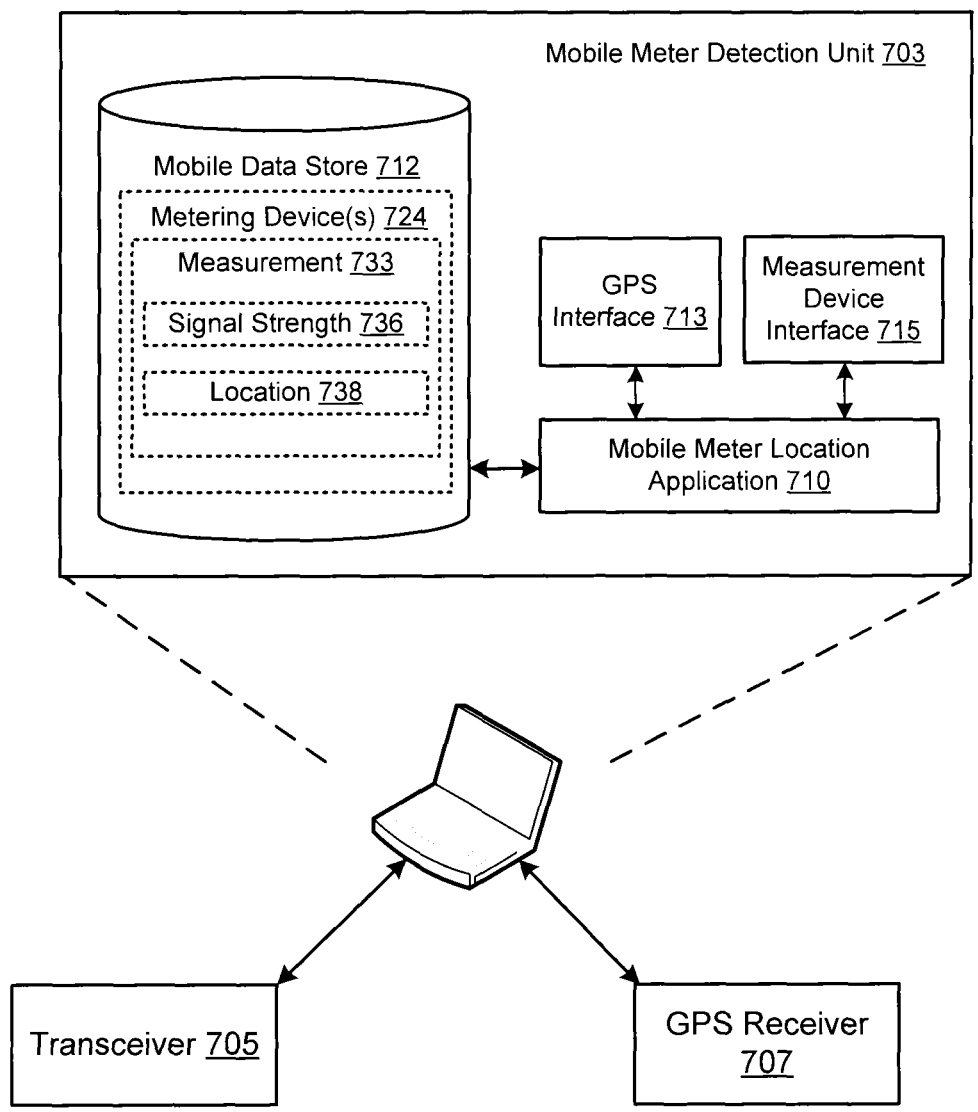
FIG. 8 is a drawing of a mobile meter detection unit according to various embodiments of the present disclosure.

To illustrate an alternative way to locate an unauthorized metering device within a zone of interest, reference is now made to FIG. 8, which depicts a mobile meter detection unit 703 in accordance with an embodiment of the disclosure. The mobile meter detection unit 703 provides an alternative way to conduct an investigation within a zone of interest in order to narrow the location associated with an unauthorized metering device within a zone of interest. As described above, one way that a location associated with an unauthorized metering device can be identified within a zone of interest involves signal strength measurements associated with the device being taken at successive angles from within the zone of interest until a structure or location associated with the device is identified. Alternatively, the depicted mobile meter detection unit 703 can also be employed to facilitate locating an unauthorized metering device within a zone of interest.

In one embodiment, the mobile meter detection unit 703 can be incorporated into an investigation vehicle or used on foot in order to locate an unauthorized meter. The mobile meter detection unit 703 can issue a plurality of commands to the unauthorized metering device, instructing the device to make a transmission. In one example, the mobile meter detection unit 703 can instruct the unauthorized metering device to make transmissions periodically. In another example, the mobile meter detection unit 703 can instruct the unauthorized metering device to make transmission at irregular or randomized intervals. In this way, the effects of signal multipath or other signal interference can be mitigated. Accordingly, the mobile meter detection unit 703 can determine a signal strength associated with the transmissions as well as a location associated with the mobile meter detection unit 703 when one or more of the transmissions are received to facilitate plotting the location of the unauthorized metering device on a map.

In the depicted non-limiting example, the mobile meter detection unit 703 can be implemented in at least one computing device that can be similar in structure as described above in reference to the metering management system 103. The mobile meter detection unit 703 can be implemented in a laptop computer, tablet computing device, or other portable computing system that can be moved about within the zone of interest. The mobile meter detection unit 703 can be in communication with at least one transceiver 705 that is configured to receive and/or transmit messages to the unauthorized metering device. The transceiver 705 can be configured as an omni-directional device or a directional device depending on the density of the area under investigation. In other embodiments, such as in the context of a power line carrier system, the receiver can be configured as a dielectrically isolated clamp receiver, a "hot stick", etc, or other device configured to receive transmissions from a metering device via a distribution line. Such a receiver can also be portable so that it can be coupled to a distribution line at various geographic locations in order to develop a map of a zone of interest as described herein. It should be appreciated that the transceiver 705 can, in some embodiments, be implemented as a separate signal transmitter and receiving antenna which can both be in communication with the mobile meter detection unit 703.

The mobile meter detection unit 703 can also be in communication with a global positioning system (GPS) receiver 707, which can facilitate determining a location associated with the mobile meter detection unit 703 at any given point in time. It should be appreciated that the GPS receiver 707 can also comprise a unit configured to determine a location of the mobile meter detection unit 703 via other location based technologies, such as cellular triangulation, assisted GPS, and/or other satellite based location technologies other than GPS. In one embodiment, the GPS receiver 707 and/or transceiver 705 can be in communication with the mobile meter detection unit 703 via a serial and/or parallel hardware interface. In other embodiments, these devices can be in communication with the mobile meter detection unit 703 via a network interface. In yet other embodiments, these devices can be incorporated into the hardware of a computing device as integrated hardware components.

The mobile meter detection unit 703 can also be configured to execute a mobile meter location application 710 that can coordinate investigation of an unauthorized metering device within a zone of interest. The mobile meter detection unit 703 can also execute a GPS interface 713 and a measurement device interface 715, which can facilitate interactions with the GPS receiver 707 and transceiver 705, respectively. The mobile meter detection unit 703 can also include a mobile data store 712, which can store data regarding transmissions from an unauthorized utility metering device under investigation. The mobile data store 712 can include a database or other data file or storage scheme in which data regarding the metering device 724 can be stored. Data regarding a plurality of measurements 733 can be stored within the mobile data store 712. In the depicted example, the mobile data store 712 is configured to store a signal strength 736 and location 738 associated with measurements 733 of transmissions from an unauthorized utility metering device. It should be appreciated that in some embodiments, data can be transmitted to a metering management system 103 and/or another remote computing device for storage in a data store or other data storage mechanism rather than stored locally on the mobile meter detection unit 703.

The mobile meter location application 710 can initiate measurements of signals emitted from an unauthorized utility metering device by issuing a command to the device that causes the device to initiate a transmission. Because the mobile meter detection unit 703 can be located within the identified zone of interest, the mobile meter detection unit 703 can receive the transmission and record a signal strength associated with the transmission in the mobile data store 712. The mobile meter detection unit 703 can also record a location associated with the transmission in the mobile data store 712 that is associated with the measurement 724. In one embodiment, the mobile meter location application 710 can record a location of the mobile meter detection unit 703 in the mobile data store 712. In some embodiments, depending on the type of utility metering device that is designated as the unauthorized device, various transceiver 705 types may be needed in order to send and/or receive transmissions from the device. Accordingly, the measurement device interface 715 can provide a generalized software interface with which the mobile meter location application 710 can interact, and the measurement device interface 715 can convert data sent to and/or received from a utility metering device into potentially varying device specific data formats. The GPS interface 713 can perform similar data transformation on behalf of the mobile meter location application 710 for interactions with the GPS receiver 707.

Accordingly, in one embodiment, the mobile meter detection unit 703 can be transported within or near the zone of interest so that the location of an unauthorized utility metering device can be identified. The mobile meter detection unit 703 can take measurements of signal strength and plot these measurements on a map until the location of the device can be ascertained. It should be appreciated that the closer the mobile meter detection unit 703 is to the unauthorized utility metering device, the stronger the signal strength measurements that will result. Therefore, the unauthorized utility metering device can be located by analyzing a map on which these signal strength measurements can be plotted.

Therefore, in one embodiment, the mobile meter location application 710 can, in the case of a two-way utility metering device that is designated as the unauthorized utility metering device, issue a command causing the device to send a transmission. In the case of a one-way utility metering device, the mobile meter location application 710 can listen for transmissions from the unauthorized utility metering device according to a predetermined periodic transmission schedule specified by the device manufacturer. The mobile meter location application 710 can, via the measurement device interface 715, receive the transmission and record a signal strength associated with the transmission in the mobile data store 712. The mobile meter location application 710 can also record a time stamp associated with the receipt of the transmission that can be recorded in the mobile data store 712 and associated with the recorded signal strength 736. The mobile meter location application 710 can also detect a location via the GPS receiver 707 that is associated with the mobile meter detection unit 703 for the moment when the signal strength 736 is detected as well as another corresponding time stamp. It should be appreciated that the mobile meter location application 710 can perform the step of taking a signal strength measurement and detection a location substantially simultaneously and record a single time stamp associated with both the signal strength 736 and the location 738 in the mobile data store 712. It should also be appreciated that the mobile meter location application 710 can forgo recording a time stamp and associate the signal strength 736 and location 738 with one another without recording a time stamp.

The mobile meter location application 710 can then plot the signal strength measurements on a map to facilitate locating the unauthorized utility metering device within the zone of interest. Accordingly, reference is now made to FIG. 9, which depicts a graphical representation of a map that can be generated by the mobile meter location application 710 or generated from data collected by the mobile meter location application 710 and stored in the mobile data store 712. In some embodiments, the mobile meter detection unit 703 can merely collect data regarding an unauthorized utility metering device by traveling within the zone of interest to collect signal strength data associated with the unauthorized utility metering device. The meter location application 110 or other software module and/or application can plot the signal strength measurements on a map and perform an analysis to determine the location of an unauthorized utility metering device.

Figure 9:
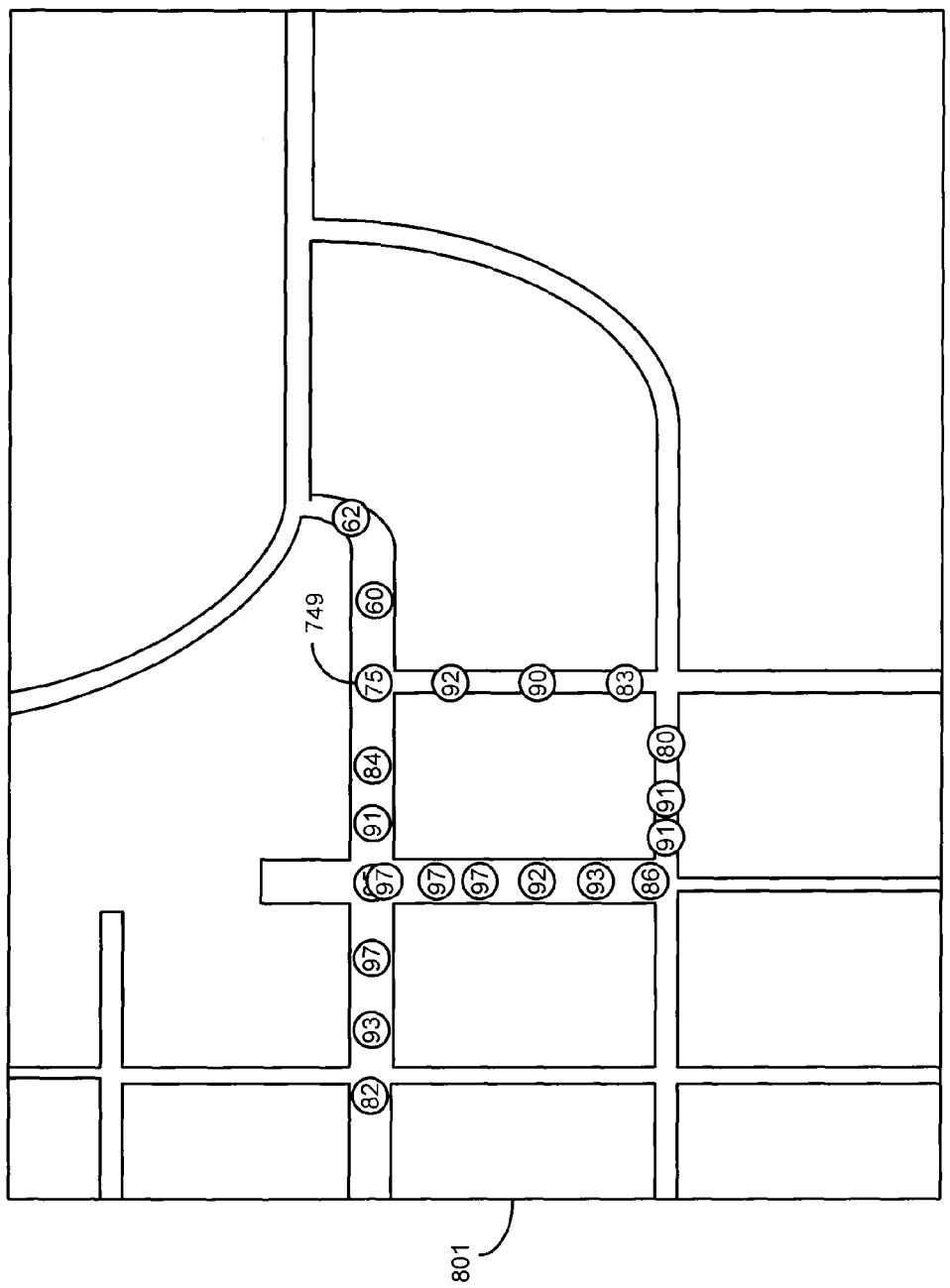
FIG. 9 is a drawing of a zone of interest and investigation with the mobile meter detection unit of FIG. 8.

With reference to the map 801 of FIG. 9, the mobile meter detection unit 703 can collect various signal strength measurements 749 and plot the measurements on a map 801 as shown in the example of FIG. 9. As described above, measurements taken by the mobile meter location application 710 have a signal strength and location associated therewith, so the measurements can be plotted on a map and analyzed to determine a location associated with the unauthorized utility metering device. In the depicted example, the plotted measurements 749 are captured from a mobile meter detection unit 703 that can be vehicle mounted and travel within the zone of interest identified as described above. Accordingly, the plotted measurements are associated with a location on the public right of way. Therefore, a location associated with an address and/or intersection on the public right of way can be identified. The mobile meter location application 710 or other software module and/or application can then designate a location on the map within or near the zone of interest as a location associated with the unauthorized utility metering device. In one example, a location where a cluster of high signal strength measurements were taken and recorded by the mobile meter location application 710 can be designated as a location within the zone of interest that is associated with the unauthorized utility metering device. In another example, the location associated with the highest signal strength measurement recorded by the mobile meter location application 710 can be designated as a location associated with the unauthorized utility metering device.

Figure 10:
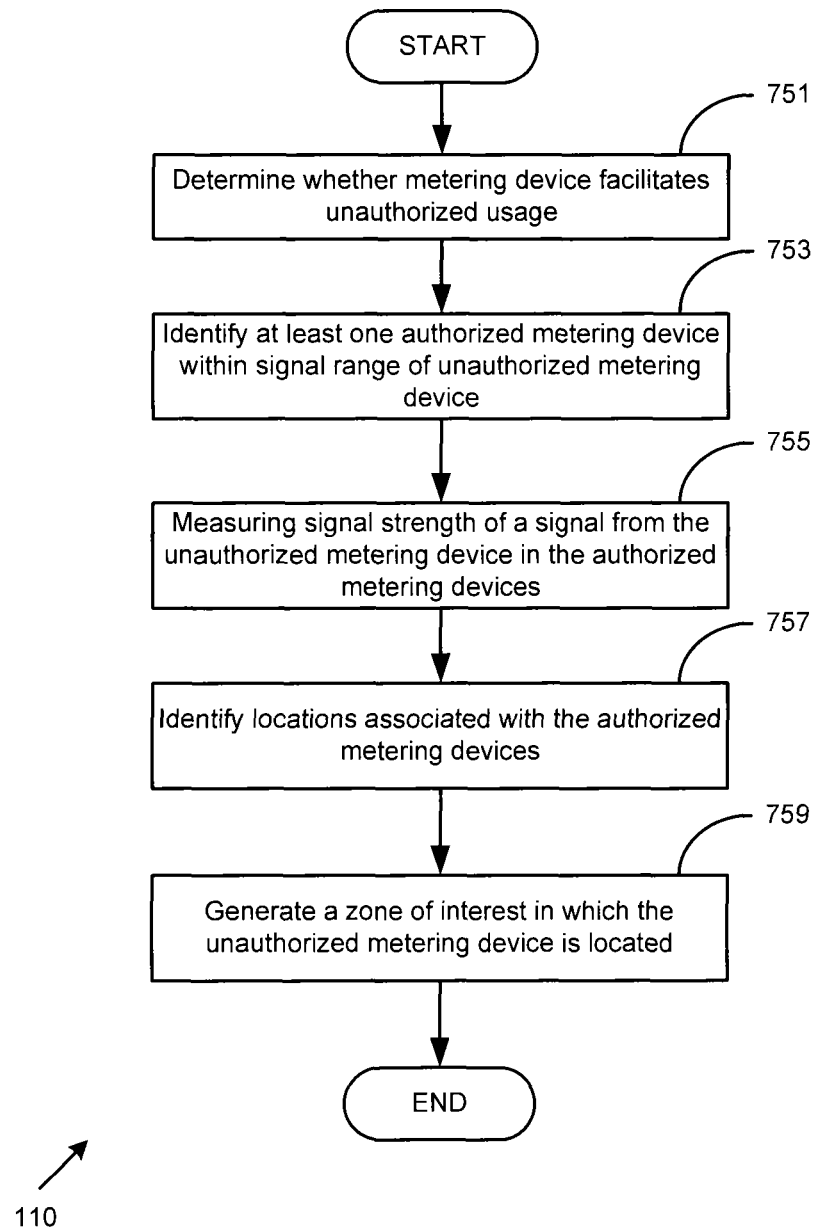
FIG. 10 is a flowchart illustrating one example of operation of the meter location application.

Referring next to FIG. 10, shown is a flowchart that provides one example of the operation of a portion of the meter location application 110 according to various embodiments. It is understood that the flowchart of FIG. 10 provides merely an example of the many different types of functional arrangements that may be employed to generate a zone of interest as described herein. As an alternative, the flowchart of FIG. 10 may be viewed as depicting an example of steps of a method implemented in the metering management system 103 (FIG. 1) according to one or more embodiments.

Beginning with box 751, the meter location application 110 can determine whether a utility metering device is facilitating unauthorized utility usage and designate the utility metering device as an unauthorized utility metering device. As described above, the meter location application 110 can make this determination based upon one or more of a variety of factors. In box 753, the meter location application 110 can identify at least one authorized metering device that is within signal range of the unauthorized metering device. The meter location application 110 can then query the authorized utility metering devices for a signal strength of a transmission from the unauthorized utility metering device. The meter location application 110 can then identify locations associated with the authorized metering devices. In some embodiments, the meter location application 110 can plot the locations on a map or a job aid for utility personnel to conduct additional field investigations to refine an identification of a location of the unauthorized utility metering device, which is described hereinabove. In box 759, the meter location application 110 can generate a zone of interest in which it is likely the unauthorized metering device is located. Additional investigations can occur in the zone of interest to locate an address, building or structure on which the unauthorized utility metering device is located.

Figure 11:
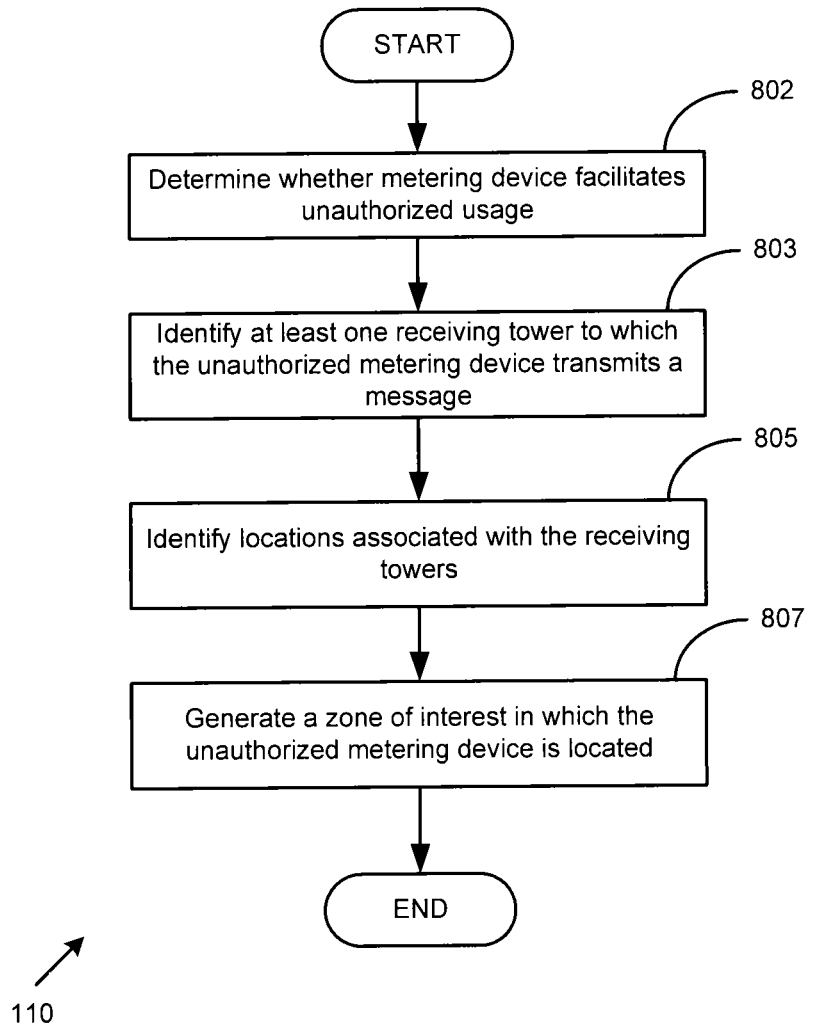
FIG. 11 is a flowchart illustrating one example of operation of the meter location application.

FIG. 11 represents an alternative example of the operation of a portion of the meter location application 110 according to various embodiments. It is understood that the flowchart of FIG. 11 provides merely an example of the many different types of functional arrangements that may be employed to generate a zone of interest as described herein. As an alternative, the flowchart of FIG. 11 may be viewed as depicting an example of steps of a method implemented in the metering management system 103 (FIG. 1) according to one or more embodiments.

The example of FIG. 11 represents an example of generating a zone of interest without the benefit of a mesh or partial mesh network of utility metering devices from which signal strength measurements can be taken. Instead, the flowchart of FIG. 11 represents an example of generating a zone of interest based upon the location of communications towers associated with the unauthorized utility metering device under investigation. Accordingly, in box 802, the meter location application 110 determines whether a metering device is facilitating unauthorized utility usage. If so, the metering device is designated as an unauthorized utility metering device. Next, in box 803, the meter location application 110 identifies at least one communications tower through which utility usage data or other information is transmitted from the unauthorized utility metering device to the metering management system 103.

In box 805, the meter location application 110 identifies locations, communities, neighborhoods, and/or regions associated with the communications towers with which the unauthorized utility metering device has communicated. In box 807, the meter location application 110 generates a zone of interest in which the unauthorized metering device from the location of the communications towers identified in box 803 and their locations, which are identified in box 805. The meter location application 110 can identify a neighborhood, community, etc., in which the unauthorized utility metering device is located based upon the location of the communications towers that are identified in box 803.

Figure 12:
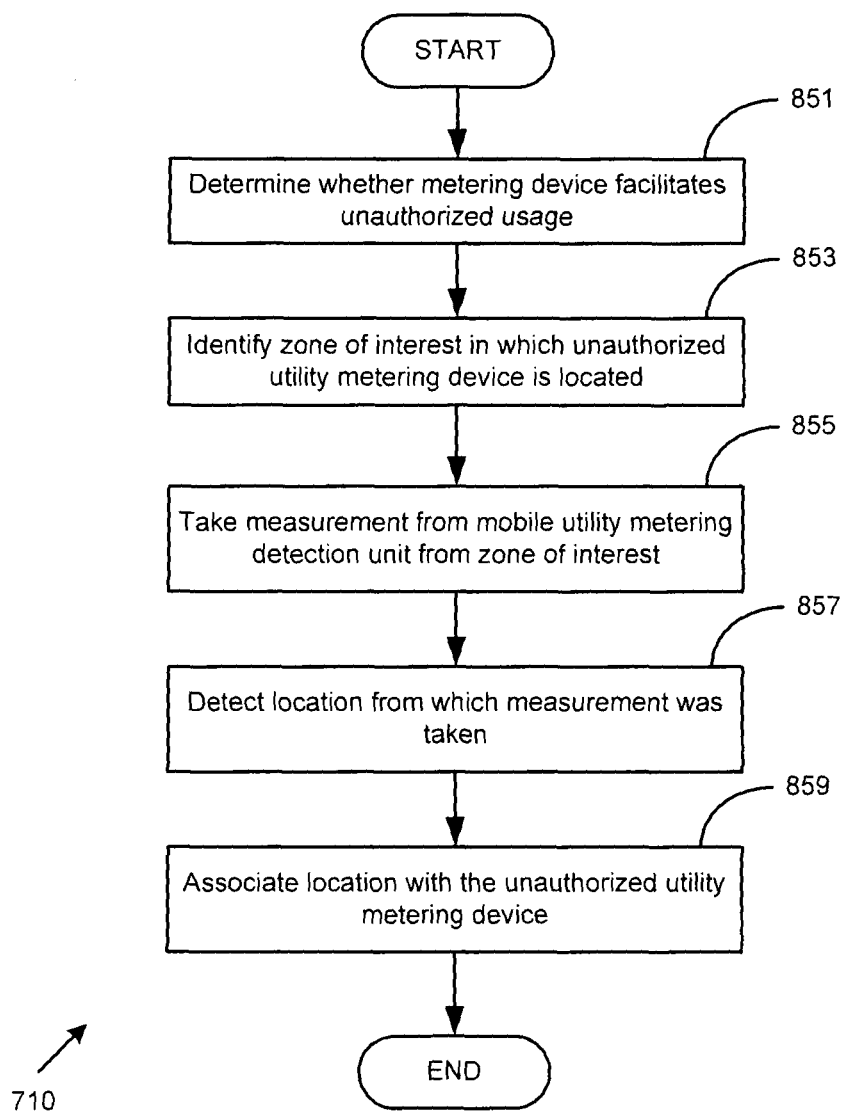
FIG. 12 is a flowchart illustrating one example of operation of the mobile meter location application.

Referring next to FIG. 12, shown is a flowchart that provides one example of the operation of a portion of the mobile meter location application 710 according to various embodiments. It is understood that the flowchart of FIG. 12 provides merely an example of the many different types of functional arrangements that may be employed to generate a zone of interest as described herein. As an alternative, the flowchart of FIG. 12 may be viewed as depicting an example of steps of a method implemented in the mobile meter detection unit 703 according to one or more embodiments.

First, in box 851 it is determined whether a metering device facilitates unauthorized utility usage. In box 853, the mobile meter location application 710 identifies a zone of interest associated with the unauthorized utility metering device. As described above, a zone of interest can be identified by the metering management system 103 by identifying authorized meters that are within range to receive a signal from the unauthorized metering device. Alternatively, the metering management system 103 can also identify communications towers in a metering infrastructure that receive a signal from the unauthorized utility metering device and then identify a geographic area associated with the communications towers.

In box 855, at least one signal strength measurement can be taken in an mobile meter detection unit 703 that can move about within the zone of interest. In box 857, the location for each of the at least one measurement can be detected so that the locations can be plotted on a map. Accordingly, in box 859, the location of the unauthorized utility metering device can be identified by performing an analysis on the map generated from the data collected by the mobile meter detection unit 703. The mobile meter location application 710 can rank the plurality of measurements taken by the mobile meter detection unit 703 by signal strength and identify a cluster of high signal strength measurements. In another embodiment, the mobile meter location application 710 can designate the location of the unauthorized utility metering device as the location associated with or being adjacent to the highest signal strength measurements.

Figure 13:
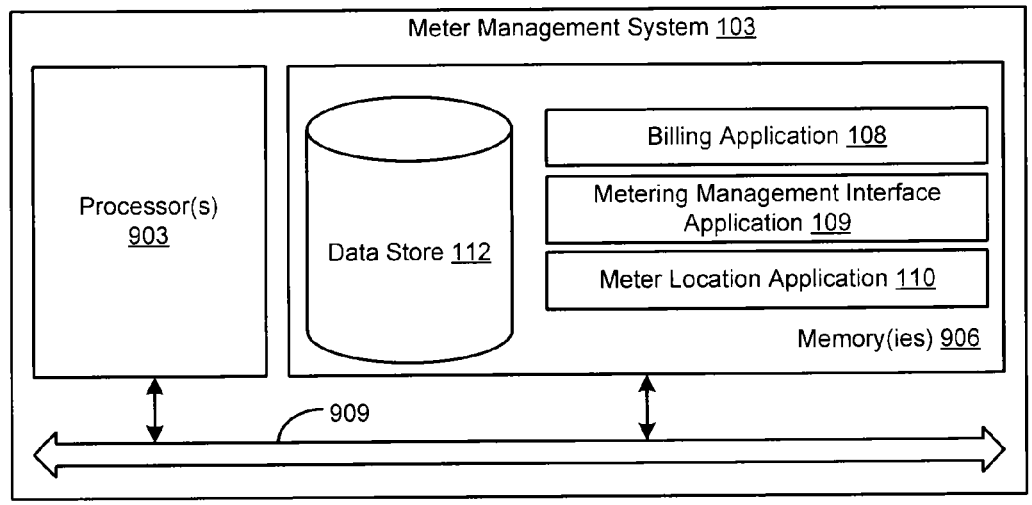
FIG. 13 is a schematic diagram illustrating one embodiment of a metering management system of FIG. 1.
Figure 14:
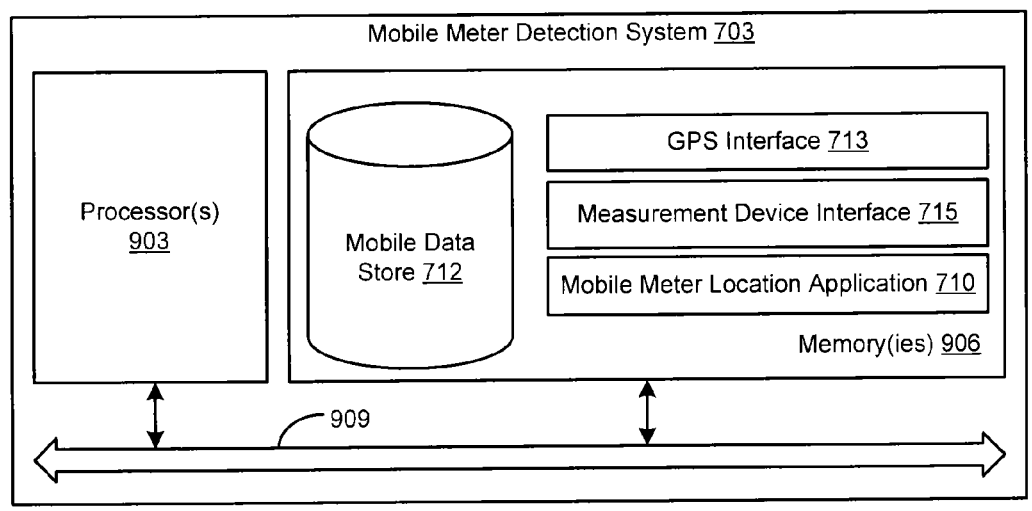
FIG. 14 is a schematic diagram illustrating one embodiment of a mobile meter detection unit of FIG. 8.

With reference to FIGS. 13-14, shown is a schematic block diagram of the metering management system 103 and mobile meter detection unit 703 according to an embodiment of the present disclosure. The metering management system 103 and/or mobile meter detection unit 703 can be implemented on a computing device that includes at least one processor circuit, for example, having a processor 903 and a memory 906, both of which are coupled to a local interface 909. To this end, the computing device may comprise, for example, at least one server computer, mobile computing device, or like device. The local interface 909 may comprise, for example, a data bus with an accompanying address/control bus or other bus structure as can be appreciated.

Stored in the memory 906 are both data and several components that are executable by the processor 903. In particular, stored in the memory 906 and executable by the processor 903 are the meter location application 110, mobile meter location application 710, and potentially other applications. Also stored in the memory 906 may be a data store 112 and other data. In addition, an operating system may be stored in the memory 906 and executable by the processor 903.

It is understood that there may be other applications that are stored in the memory 906 and are executable by the processors 903 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 906 and are executable by the processor 903. In this respect, the term "executable" means a program file that is in a form that can ultimately be run by the processor 903. Examples of executable programs may be, for example, a compiled program that can be translated into machine code in a format that can be loaded into a random access portion of the memory 906 and run by the processor 903, source code that may be expressed in proper format such as object code that is capable of being loaded into a random access portion of the memory 906 and executed by the processor 903, or source code that may be interpreted by another executable program to generate instructions in a random access portion of the memory 906 to be executed by the processor 903, etc. An executable program may be stored in any portion or component of the memory 906 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 906 is defined herein as including both volatile and nonvolatile memory and data storage components. Volatile components are those that do not retain data values upon loss of power. Nonvolatile components are those that retain data upon a loss of power. Thus, the memory 906 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 903 may represent multiple processors 903 and the memory 906 may represent multiple memories 906 that operate in parallel processing circuits, respectively. In such a case, the local interface 909 may be an appropriate network that facilitates communication between any two of the multiple processors 903, between any processor 903 and any of the memories 906, or between any two of the memories 906, etc. The local interface 909 may comprise additional systems designed to coordinate this communication, including, for example, performing load balancing. The processor 903 may be of electrical or of some other available construction.

Although the meter location application 110 and/or mobile meter location application 710, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 9-11 show the functionality and operation of an implementation of portions of the meter location application 110 and mobile meter location application 710, respectively. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 903 in a computer system or other system. The machine code may be converted from the source code, etc. If embodied in hardware, each block may represent a circuit or a number of interconnected circuits to implement the specified logical function(s).

Although the flowcharts of FIGS. 9-11 show a specific order of execution, it is understood that the order of execution may differ from that which is depicted. For example, the order of execution of two or more blocks may be scrambled relative to the order shown. Also, two or more blocks shown in succession in FIGS. 9-11 may be executed concurrently or with partial concurrence. Further, in some embodiments, one or more of the blocks shown in FIGS. 9-11 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the meter location application 110 and/or mobile meter location application 710, that comprises software or code can be embodied in any non-transitory computer-readable medium for use by or in connection with an instruction execution system such as, for example, a processor 903 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:

determining whether an unauthorized utility metering device is being employed to facilitate unauthorized utility service access;

identifying a zone of interest in which the unauthorized utility metering device is located, the zone of interest defining a geographic region in which the unauthorized utility metering device is located;

taking a plurality of signal strengths associated with at least one of a plurality of transmissions from the unauthorized utility metering device by issuing a plurality of commands from a mobile detection unit to the unauthorized utility metering device to transmit a message, the plurality of signal strengths being taken by a directional antenna coupled to a motorized mechanism that rotates the directional antenna, the directional antenna being rotated to facilitate taking at least one of the plurality of signal strengths at a plurality of angles;

detecting a plurality of locations of the mobile detection unit from which at least one of the plurality of signal strengths were taken;

generating a first plurality of time stamps associated with taking the plurality of signal strengths, wherein a respective one of the first plurality of time stamps indicates when a respective one of the plurality of signal strengths occurred;

generating a second plurality of time stamps associated with detecting the plurality of locations where a respective one of the plurality of signal strengths is taken, wherein a respective one of the second plurality of time stamps indicates when the plurality of locations were detected;

storing the first plurality of time stamps and the second plurality of time stamps in a memory;

associating at least one of the plurality of locations with a respective at least one of the plurality of signal strengths based at least in part upon the first plurality of time stamps and the second plurality of time stamps;

ranking the plurality of locations according to the plurality of signal strengths;

plotting the plurality of signal strengths on a map;

narrowing the zone of interest based at least upon the ranking of the plurality of locations according to the plurality of signal strengths; and identifying a utility metering device as the unauthorized utility metering device in one of the plurality of angles from the plurality of locations within the zone of interest.

2. A mobile utility metering detection unit, comprising:

at least one directional antenna transceiver, the at least one directional antenna transceiver configured to communicate with an unauthorized utility metering device, the at least one directional antenna transceiver coupled to a motorized mechanism that rotates the at least one directional antenna transceiver;

a location detection unit configured to detect a location of the mobile utility metering detection unit, the location detection unit comprising a radio frequency (RF) receiver; and at least one computing device in communication with the at least one directional antenna transceiver and the location detection unit, the at least one computing device configured to execute a mobile meter location application, wherein, when executed, the mobile meter location application causes the at least one computing device to:
determine that the unauthorized utility metering device is being employed to facilitate an unauthorized utility service access;
identify a zone of interest in which the unauthorized utility metering device is located, the zone of interest defining a geographic region in which the unauthorized utility metering device is located;
take a plurality of signal strengths at a plurality of angles associated with at least one of a plurality of transmissions from the unauthorized utility metering device by issuing a plurality of commands from the mobile utility metering detection unit to the unauthorized utility metering device to transmit a message, the at least one directional antenna transceiver being rotated to facilitate taking at least one of the plurality of signal strengths at the plurality of angles;
generate a first at least one time stamp associated with taking individual ones of the plurality of signal strengths;
detect a plurality of locations from which the plurality of signal strengths were taken;
generate a second at least one time stamp associated with detecting a respective one of the plurality of locations when a respective one of the plurality of signal strengths is taken;
store the first at least one time stamp and the second at least one time stamp in a memory in communication with the mobile utility metering detection unit;
associate at least one of the plurality of locations with a respective at least one of the plurality of signal strengths based at least in part upon the first at least one time stamp and the second at least one time stamp;
rank the plurality of locations according to individual ones of the plurality of signal strengths;
plot the plurality of signal strengths on a map;
narrow the zone of interest based at least upon the ranking of the plurality of locations according to the plurality of signal strengths; and
identify a utility metering device as the unauthorized utility metering device in one of the plurality of angles from the plurality of locations within the zone of interest.

3. The mobile utility metering detection unit of claim 2, wherein said taking the plurality of signal strengths associated with at least one of the plurality of transmissions from the unauthorized utility metering device further causes the at least one computing device to at least:
detect one of the plurality of signal strengths associated with at least one corresponding transmission from the unauthorized utility metering device;
detect the location associated with the mobile utility metering detection unit when the one of the plurality of signal strengths is detected;
generate the first at least one time stamp associated with a recording of the one of the plurality of signal strengths; and
record the plurality of signal strengths, the location associated with the mobile utility metering detection unit, and the first at least one time stamp.

4. The mobile utility metering detection unit of claim 3, wherein said issuing the plurality of commands from the mobile utility metering detection unit to the unauthorized utility metering device to transmit the message further causes the at least one computing device to at least issue the commands on a periodic basis.

5. The mobile utility metering detection unit of claim 3, wherein said issuing the plurality of commands from the mobile utility metering detection unit to the unauthorized utility metering device to transmit the message further causes the at least one computing device to at least vary a time period between issuing the commands.

6. The mobile utility metering detection unit of claim 2, wherein the plurality of transmissions from the unauthorized utility metering device are received on a periodic basis, the periodic basis corresponding to a reporting interval associated with the unauthorized utility metering device.

7. The mobile utility metering detection unit of claim 2, wherein said identifying the zone of interest in which the unauthorized utility metering device is located further causes the at least one computing device to at least:
identify at least one communication tower with which the unauthorized utility metering device has communicated; and
identify a geographic region associated with the at least one communication tower; and
designate the geographic region as the zone of interest.

8. A method, comprising:
determining whether an unauthorized utility metering device is being employed to facilitate an unauthorized utility service access;
identifying a zone of interest in which the unauthorized utility metering device is located, the zone of interest defining a geographic region in which the unauthorized utility metering device is located;

taking a plurality of signal strengths associated with at least one of a plurality of transmissions from the unauthorized utility metering device by issuing a plurality of commands from a mobile detection unit to the unauthorized utility metering device to transmit the plurality of transmissions, the plurality of signal strengths being taken by a directional antenna coupled to a motorized mechanism that rotates the directional antenna, the directional antenna being rotated to facilitate taking at least one of the plurality of signal strengths at a plurality of angles;

generating a first at least one time stamp associated with taking individual ones of the plurality of signal strengths;

detecting a plurality of locations from which the plurality of signal strengths were taken;

generating a second at least one time stamp associated with detecting a location when a respective one of the plurality of signal strengths is taken; and associating at least one of the plurality of locations with a respective at least one of the plurality of signal strengths based at least in part upon the first at least one time stamp and the second at least one time stamp;

ranking the plurality of locations according to individual ones of the plurality of signal strengths;

plotting the plurality of signal strengths on a map;

narrowing the zone of interest based at least upon the ranking of the plurality of locations according to the plurality of signal strengths; and identifying a utility metering device as the unauthorized utility metering device in one of the plurality of angles from the plurality of locations within the zone of interest.

9. The method of claim 8, wherein the unauthorized utility metering device is a power line carrier device, and said identifying the zone of interest further comprises:

identifying at least one substation in which at least one signal associated with the unauthorized utility metering devices is received; and identifying a substation associated with a signal having a highest signal strength.

10. The method of claim 9, wherein said identifying the zone of interest further comprises identifying a feeder and a phase associated with a signal having the highest signal strength.

11. The method of claim 9, wherein said taking the plurality of signal strengths associated with the at least one of the plurality of transmissions from the unauthorized utility metering device further comprises coupling a power line carrier signal receiver to at least one distribution line within the zone of interest.

12. The method of claim 8, wherein said associating at least one of the plurality of locations with a respective at least one of the plurality of signal strengths further comprises storing the first at least one time stamp and the second at least one time stamp in a memory.

13. The method of claim 8, wherein said plotting the plurality of signal strengths on the map further comprises associating individual ones of the first at least one time stamp with one of the second at least one time stamp.

14. The method of claim 8, wherein said taking the plurality of signal strengths associated with the at least one of the plurality of transmissions from the unauthorized utility metering device further comprises:

detecting one of the plurality of signal strengths associated with at least one corresponding transmission from the unauthorized utility metering device;

detecting a location associated with the mobile detection unit when the one of the plurality of signal strengths is detected;

generating a time stamp associated with a recording of the one of the plurality of signal strengths; and recording the one of the plurality of signal strengths, the location associated with the mobile detection unit, and the time stamp.

15. The method of claim 14, wherein said issuing the plurality of commands from the mobile detection unit to the unauthorized utility metering device to transmit a message further comprises issuing the commands on a periodic basis.

16. The method of claim 14, wherein said issuing the plurality of commands from the mobile detection unit to the unauthorized utility metering device to transmit a message further comprises varying a time period between issuing the commands.

17. The method of claim 8, wherein said identifying the zone of interest in which the unauthorized utility metering device is located further comprises:

identifying at least one communication tower with which the unauthorized utility metering device has communicated;

identifying a geographic region associated with the at least one communication tower; and designating the geographic region as the zone of interest.

* * * * *